(12) United States Patent
Haas et al.

(10) Patent No.: US 10,399,277 B2
(45) Date of Patent: Sep. 3, 2019

(54) TRANSPORT SYSTEM, PLASTICS-PROCESSING JOINING SYSTEM, METHOD FOR OPERATING A PLASTICS-PROCESSING JOINING SYSTEM AND PRODUCT PRODUCED THEREBY

(71) Applicant: KIEFEL GmbH, Freilassing (DE)

(72) Inventors: Johann Haas, Koestendorf (AT); Thomas Halletz, Waging am See (DE)

(73) Assignee: KIEFEL GmbH (DE)

( * ) Notice: Subject to any disclaimer, the term of this patent is extended or adjusted under 35 U.S.C. 154(b) by 417 days.

(21) Appl. No.: 14/774,451

(22) PCT Filed: Mar. 28, 2014

(86) PCT No.: PCT/DE2014/000153
§ 371 (c)(1),
(2) Date: Sep. 10, 2015

(87) PCT Pub. No.: WO2014/154196
PCT Pub. Date: Oct. 2, 2014

(65) Prior Publication Data
US 2016/0031154 A1     Feb. 4, 2016

(30) Foreign Application Priority Data

Mar. 28, 2013   (DE) .................. 10 2013 005 356

(51) Int. Cl.
*B29C 65/00*     (2006.01)
*B29C 65/02*     (2006.01)
(Continued)

(52) U.S. Cl.
CPC ........ *B29C 66/53262* (2013.01); *B29C 65/02* (2013.01); *B29C 65/7867* (2013.01);
(Continued)

(58) Field of Classification Search
CPC .......................... B65G 37/02; B29C 65/7867
(Continued)

(56) References Cited

U.S. PATENT DOCUMENTS

| 5,803,888 A * | 9/1998 | Severs ................... B29C 65/78 |
| | | 226/173 |
| 8,272,827 B2 * | 9/2012 | Bufano ............. H01L 21/67017 |
| | | 414/217.1 |
| 2004/0134755 A1 * | 7/2004 | Sticht ..................... B65G 35/06 |
| | | 198/465.2 |

FOREIGN PATENT DOCUMENTS

| CN | 101015955 A | 8/2007 |
| CN | 202728648 U | 2/2013 |

(Continued)

OTHER PUBLICATIONS

International Search Report of PCT/DE2014/000153, dated Oct. 15, 2014.
(Continued)

*Primary Examiner* — Gene O Crawford
*Assistant Examiner* — Lester Ill Rushin
(74) *Attorney, Agent, or Firm* — Tarolli, Sundheim, Covell & Tummino LLP

(57) ABSTRACT

The invention relates to a transport system for a plastics-processing joining system, to the joining system itself and to a method for operating a plastics-processing joining system. It is known to feed plastics components by means of transport systems for processing purposes to a main material transport means, for example moving film path, in order to produce bags for medical purposes.
According to the invention, individually controlled movable workpiece carriers for the components are provided, or in addition to a work conveyor path for the workpiece carriers,
(Continued)

a path for temporary parking is provided for a separate multitude of workpiece carriers.

22 Claims, 1 Drawing Sheet

(51) Int. Cl.
    *B29C 65/78*       (2006.01)
    *B65G 17/12*       (2006.01)
    *B65G 54/02*       (2006.01)
    *B29C 65/18*       (2006.01)
    *B29L 31/00*       (2006.01)

(52) U.S. Cl.
    CPC ...... *B29C 65/7879* (2013.01); *B29C 66/1122* (2013.01); *B29C 66/8432* (2013.01); *B29C 66/8511* (2013.01); *B65G 17/12* (2013.01); *B65G 54/02* (2013.01); *B29C 65/18* (2013.01); *B29L 2031/7148* (2013.01)

(58) Field of Classification Search
    USPC .. 198/341.01, 343.2, 346.2, 465.2, 358, 580
    See application file for complete search history.

(56) References Cited

FOREIGN PATENT DOCUMENTS

| | | |
|---|---|---|
| DE | 10 2006 004611 A1 | 8/2007 |
| EP | 0 589 575 A1 | 3/1994 |
| EP | 2 052 842 A1 | 4/2009 |
| WO | 00/68089 A1 | 11/2000 |

OTHER PUBLICATIONS

Chinese Office Action in CN 201480018934.6, dated Jul. 26, 2017.
Chinese Office Action in CN 201480018934.6, dated Oct. 8, 2016.

\* cited by examiner

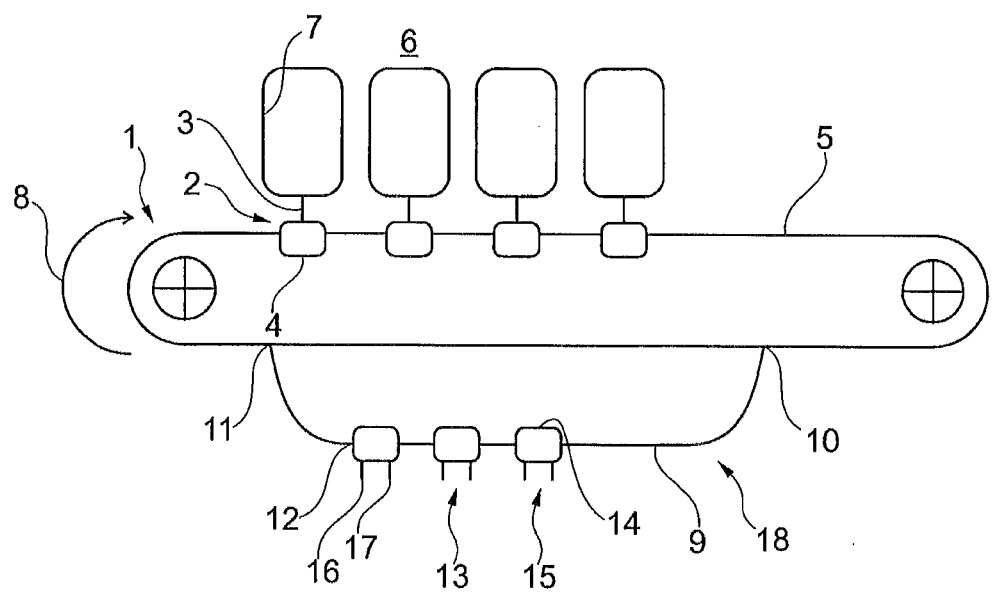

TRANSPORT SYSTEM, PLASTICS-PROCESSING JOINING SYSTEM, METHOD FOR OPERATING A PLASTICS-PROCESSING JOINING SYSTEM AND PRODUCT PRODUCED THEREBY

CROSS REFERENCE TO RELATED APPLICATIONS

This application is the National Stage of PCT/DE2014/000153 filed on Mar. 28, 2014, which claims priority under 35 U.S.C. § 119 of German Application No. 10 2013 005 356.0 filed on Mar. 28, 2013, the disclosure of which is incorporated by reference. The international application under PCT article 21(2) was not published in English.

BACKGROUND OF THE INVENTION

1. Field of the Invention

The invention relates to a transport system for a multitude of identical workpieces, to a plastics-processing joining system, to a method for operating a plastics-processing joining system and to a product produced thereby, more specifically a medical bag.

2. Description of the Related Art

Plastics-processing joining systems and the transport system used therein are extensively known from the prior art.

The type of machines considered herein supply components that are intended for processing. In the prior art, chain conveyor systems or path conveyor systems are used for supplying the components, for example plastic tubes, plastic tubules or valves, especially when medical bags or other medical containers are produced in the installation. For example, mandrel holders with mandrels are mounted on the usually horizontally circulating chain, wherein, in the framework of the present patent application, a "mandrel" refers to an insertion stick, which can be pushed into a plastic tubule and pulled out again. It can be a stick electrode or, alternately, simply a mechanical carrier.

The components are plugged onto the mandrels and transported between two film layers. The components are welded with the film in a welding press. The circumferential weld of the bag contour most often takes place in a second station. The mandrel chain takes on a centering function and thus determines the positioning accuracy in the respective process steps.

SUMMARY OF THE INVENTION

The problem underlying the invention is to provide an alternative to or an improvement of the prior art.

According to a first aspect of the present invention, this problem is solved by a transport system for a multitude of identical workpieces, more specifically of identical workpieces, wherein the transport system is constructed as an installation part of a plastics-processing joining system for attaching the workpieces to semi-finished products as a step for manufacturing products, wherein the transport system has a multitude of workpiece carriers on a circulating work conveyor path, wherein the workpiece carriers of the multitude have uniformly configured holding areas, so that respectively one holding area on one workpiece carrier of the multitude can interact with one of the identical workpieces, wherein the transport system is set up to simultaneously transport, during operation, several of the identical workpieces along the work conveyor path by means of the multitude of workpiece carriers, wherein the transport system is characterized in that it has a work path output means and a work path input means for the multitude of workpiece carriers.

The following terms need to be explained:

In the present patent application, the "workpieces" refer to the components to be supplied. They usually have a supply system, be it of mass-produced goods, of bulk goods or any other form of supply. The workpieces to be formed shall more specifically be plastic tubules for forming or receiving injection stoppers or extraction stoppers on medical bags. The workpieces can also be combined access tubule/injection stopper elements. They are preferably bodies manufactured at least predominantly of plastic, particularly hollow bodies with a length between approximately 10 mm and 100 mm, and with an outer diameter of most often under 1 cm, wherein it must be explicitly mentioned that other measurements for the components also come into question, such as, for example, rings or similar structures in the case of production of an ostomy bag, such as, for example, a colostomy bag.

The workpieces to be processed are referred to as a "multitude". A multitude must be understood as a countable, limited quantity out of a plurality. In the present application, an infinite multitude of workpieces, i.e. of components are processed by the installation. However, at a given point in time during the operation of the installation, only a limited quantity of workpieces is travelling along the work conveyor path. Even if at this time a much greater quantity, technically virtually "an endless quantity" of workpieces is available, the term "multitude" has been chosen, because the present invention is concerned only with what takes place in the work conveyor path.

The workpieces should be "identical", wherein, on the one hand, a departure, in terms of engineering, from the identity of the workpieces can be tolerated, wherein, on the other hand, the term must not be understood in such a way that only one type of workpieces are to be processed. Thus, during production of medical bags, it often occurs that not only one access but rather two or more accesses must be provided. In one very frequently encountered constellation, two accesses to the bag are to be provided, and therefore two plastic tubules are to be welded between the film layers, in order for one of the two tubules to serve as an access for receiving an injection stopper and the other tubule as an access for an extraction stopper.

It should be explicitly pointed out that within the framework of the present patent application, indefinite articles and multitudes such as "one . . . ", two . . . ", etc. must be understood as "at least" information, i.e. as "at least one . . . ", "at least two . . . " etc., unless it follows from the particular context that "precisely one . . . ", "precisely two . . . " etc. should be meant there.

Therefore, respectively two or more multitudes within the multitude of identical workpieces could be processed, in particular precisely two multitudes for providing precisely two different multitudes of respectively identical workpieces in the form of components for respectively two accesses to be arranged on a bag, or precisely one multitude for respectively precisely one access to be arranged on a medical bag, or three multitudes for respectively three accesses to be arranged on a bag, wherein, in practice, the constellations with one, two or three accesses on a medical bag are the most frequently encountered configurations.

It must be emphasized that when n accesses, most often in the form of plastic tubules, are to be mounted on a bag, it is possible to provide a lesser number of multitudes of identical workpieces. This is due to the fact that several of the accesses can be identically designed, or that even all the accesses on the bag are first identically designed, for example simply by welding of a plastic tubule, wherein different stoppers can be inserted into the tubules in a subsequent station, more specifically after filling of the medical bag.

The "semi-finished products" can primarily be film layers, be it in the form of a continuous sheet or in the form of single pieces of film layers. It any rate, it is particularly preferable if the semi-finished products are also made of plastic.

The transport system should be constructed as an "installation part", which means that the transport system as such and outside of the context of the production installation, does not fulfill an independent technical function, but only serves to produce the combined products from semi-finished products and supplied components, together with the installation.

The installation as such must not necessarily produce the "products" in there entirety. It is rather also conceivable that a transfer from one machine with one station or several stations to another machine with one station or several stations takes place by way of a transfer station. However, a medical bag or another medical container is preferably fully manufactured when it leaves the entire installation, i.e. more specifically also printed and/or glued and/or filled with a liquid and closed.

The "work conveyor path" describes the path followed by the workpiece carriers, i.e. the carriers for the single workpieces, more specifically plastic components, on the one hand for supplying the workpiece to the station for fastening the workpieces to the semi-finished products and on the other hand the subsequent path of the workpiece carriers back to the position in which they can receive a new workpiece, wherein the "path" is an abstract concept. In a continuous operation of the installation it makes sense to provide an endless work conveyor path, i.e. a closed circuit. In the prior art, a circulating transport chain was provided to this end. However, it must be explicitly pointed out that a path must not necessarily be continuous in order to be "circulating" in the present sense. Rather, in a broader understanding of the term, a path can also be understood as circulating, when e.g. a workpiece carrier is removed from a, for example, linear path, placed in another path and there travels back or must be relocated again. What matters is only that the workpiece arrives back where it started a cycle and from there runs in the same direction through a new cycle.

The "multitude of workpiece carriers" is a finite number of workpiece carriers. Depending on the size of the installation and, amongst others, on the number of workpieces to be incorporated per product, a multitude can include 20 to 100 workpieces. The number of workpiece carriers provided in the multitude of workpiece carriers must not be identical to the multitude of workpieces. As a rule, it will even be different, which is due to the fact that in a usual state of operation, workpiece carriers loaded with workpieces are provided, which currently transport the workpiece toward the processing station, as well as empty workpiece carriers, which are on their way to receive a new workpiece.

All workpiece carriers preferably have the same structure, except for their holding area for the workpiece, respectively a holding adapter attached there, even when different multitudes of respectively identical workpieces are to be processed.

According to the presented aspect of the invention, the transport system has a "work path output means" and a "work path input means" for the multitude of workpiece carriers.

This means that means must be provided, by means of which an active output of the workpiece carriers out of the work conveyor path and an active input of the multitude of workpiece carriers into the work conveyor path is possible, wherein the two means can be set up, with regard to their coordination, to output an identical multitude of workpiece carriers and to input them back, but preferably to output a first multitude and to input a second multitude.

In the prior art, in order to change the product to be processed in the production installation, it is necessary to exchange or convert the workpiece carriers. This implies a considerable time loss. In contrast, the presented installation can output a first multitude of workpiece carriers, out of the work path, by way of the work path output means and previously, simultaneously or subsequently input a second multitude of workpiece carriers into the work path, namely for other workpieces, and thus enable the installation to manufacture other products.

It is also conceivable to operate according to a different pattern with workpiece carriers that are in principle identical. Thus, it is conceivable that medical bags with three accesses are first produced, namely respectively by means of a plastic tubule to be welded in, in the plastics-processing joining system, wherein for example one of the plastic tubules is longer that the two others. In a modified production method, only for example two accesses can be provided for a bag, namely one access formed by the shorter tubule and the other formed by the longer tubule. In that case, the originally two multitudes of workpiece holders can still be used, while changing only the supply pattern.

Therefore, if appropriately designed, the installation according to the invention can provide a great flexibility of production, not even requiring a production shutdown when changing the respective supply of components, again if appropriately designed.

A path preferably has a rail.

Rails are time-tested and available on the market in many different forms. The transport chains used in the prior art are also guided in rails. In a simplest case, a rail can be a profile; in a more complex but preferred example, the rail can be provided with an electric or rather electro-magnetic active equipment.

It is proposed that, in the case of a rail, a closed circuit is provided for the work conveyor path by means of a rail.

The work path output means and the work path input means can be formed by a rail switch. A switch is a switching means provided between an incoming rail piece and at least two outgoing rail pieces, for switching into the further transport direction, or respectively from the direction of supply, wherein when switching into a further transport direction, i.e. in case of a bifurcation, an active switching takes place in the rail, respectively in the switch, whereas in the case of a junction, i.e. of a connector of at least two converging rail pieces with a lesser number of outgoing rail pieces, a purely passive implementation of the switch is also possible.

The principle of the switches can be adopted as such from the rail systems known in the prior art.

A preferred embodiment of the invention provides a workpiece carrier parking path.

The workpiece carrier parking path must be understood in the sense that workpiece carriers, preferably an entire multitude of workpiece carriers can be parked there, outside of the work conveyor path. Thus, in case of a planned production change, the multitude used in the currently running production can be located on the work conveyor path, whereas the workpiece carriers for the subsequent production process are provided in the workpiece carrier parking path and can be brought out of the workpiece carrier parking path into the work conveyor path at any time. Simultaneously, before or after, the previous workpiece carriers can be brought into the same or into another workpiece carrier parking path. All this can take place while the installation is running.

On the one hand, the workpiece carrier parking path can be attached to the work conveyor path in the manner of a dead end, which is directly or indirectly connected to the work conveyor path by way of one or several switches. In that case, it makes sense if the workpiece carriers can be driven into the workpiece carrier parking path in a first direction, and optionally driven back out of the workpiece carrier parking path in a second direction.

Alternately or cumulatively, it is conceivable that a workpiece carrier parking path is connected to the work conveyor path as a bypass, i.e. ideally by way of at least two switches, namely a switch branching away and after the workpiece carrier parking path, a merging switch leading back into the work conveyor path. Such a constellation would not require implementing transport movements in the opposite direction. Rather, the workpiece carriers of a multitude can be simply driven, at will, out of the work conveyor path into the bypass by way of the branching switch and, at a later time, out of the bypass back into the work conveyor path by way of the merging switch.

Especially when more than two multitudes of workpiece carriers are provided in the transport system and are used in the production operation, it is advantageous if several workpiece carrier parking paths are provided that can be approached without collision.

For example, several workpiece carrier parking paths, running in parallel and respectively formed by rails, can be provided to this end, similarly to the disposition of rails in a railway station, wherein a suitable multitude of branching and merging switches is provided.

An alternative provides for example that several dead ends are provided. It is also possible to approach several dead ends without collision, which merely requires a slightly more complex control or movement, because a workpiece carrier parking path configured as a dead end, normally requires a reversal of the direction, i.e. a transport of the workpiece carriers in the inverse direction to the direction of entry into the workpiece carrier parking path. In contrast, it seems easier if only one given direction of movement of workpiece carriers must be expected on each rail section.

A multiple distributor is also conceivable in order to be able to approach several workpiece carrier parking paths, such as e.g. a turntable, which can receive at least one workpiece carrier, then turns toward one of several available workpiece carrier parking paths and lets the workpiece carrier(s) move out into the selected workpiece carrier parking path.

However, it must be taken into account that, in such a construction, an otherwise continuous operation of the movements of the workpiece carriers must be transformed into a discontinuous introduction movement of the workpiece carriers into the work carrier parking path, which also results in an increased calculation effort.

In order to take full advantage of the constellation with one work conveyor path and one workpiece carrier parking path, it is proposed that a second multitude of workpiece carriers with uniformly designed holding areas are provided in the transport system, wherein the holding areas of the second multitude are different from the holding areas of the first multitude.

In such a constellation, the first multitude of workpiece carriers can receive a first type of workpieces, whereas the second multitude of workpiece carriers is set up to receive a second type of workpieces, wherein the two workpieces are of different types, which normally already includes different measurements. A constellation has already been mentioned in the introduction, in which different plastic bodies, mainly hollow bodies are welded into a medical bag to serve as accesses. Both can easily be transported in their form, mainly as hollow bodies, by respectively one mandrel. The holding areas are nevertheless different because different bodies must be supported.

Individual closed-loop control means from each workpiece carrier are preferably provided to a central controller.

In such a constellation, a central controller has a central processing unit and a plurality of data connections with the workpiece carriers and/or with different positions on the path of the transport system, primarily with the rail path. Many different concrete embodiments are conceivable. For example, each workpiece carrier can have a communication means and, for example, establish an individually identified data connection with the controller, be it by way of a provided electrical line, such as for example through the rail, or by way of a radio connection; in that case the workpiece carriers are designed for active communication.

An alternative provides that the controller is set up to operate with passively communicating workpiece carriers. This can take place for example in such a manner that the controller has a very precise access to the corresponding readout means of the rail, so that the rail is actively designed to recognize and transmit the presence and exact position and, as the case may be, the speed and/or other data of workpiece carriers in use.

An optical recognition is also conceivable, wherein for example a camera is disposed above the path guide or below the path guide or in any case in visual contact with the path guide, wherein image analysis means are provided, more specifically a software, so that the controller can recognize, by way of the optical analysis, where workpiece carriers are located, which type of workpiece carriers they are and/or how they are moving.

Both the workpiece carriers and the rail system are however preferably designed to be respectively active, which allows for a preferably continuous or very finely graduated control of the direction of movement, of the speed of movement, of stopping points, of acceleration ramps, of deceleration ramps and/or of the configuration of the holding area on the workpiece carrier.

The higher the fineness of the closed-loop control, the more precisely the workpiece carriers can be stopped, i.e. the more precisely pre-defined stopping points can be reached. Ultimately however, a very high precision of the closed-loop control leads to high costs. Therefore, it is proposed to provide a re-centering arrangement at a stopping point, which is arranged to grasp a mobile part on the workpiece holder, for example a holder adapter, the body of the workpiece carrier or the workpiece itself and to position it with a higher positioning accuracy. This must be understood as being advantageous independently of, but mainly in combination with, the other features of the present invention.

For example, this can be carried out with a workpiece carrier mounted in a floating manner, which is resilient mainly in the direction of movement of the workpiece carrier along the work conveyor path, because when at least a part of the body and/or of the holding area and/or of the holding adapter of the workpiece carrier has a degree of freedom in the direction of the work conveyor path, the re-centering arrangement can more easily re-center in the direction of the degree of freedom.

Alternately or in addition to the floating mounting, it can be provided that the re-centering arrangement moves the workpiece carrier to be re-centered along a freedom degree that differs from the direction of transport. For example, the workpiece carrier can take off vertically upward or otherwise orthogonally or at least substantially orthogonally or in any case in any direction out of the path; in particular, it can lift off from a slide. The workpiece carrier is then free or at least freer in its possible movements and can be centered, i.e. precisely positioned by a re-centering arrangement for the tool. For example, it is conceivable to provide a lifting table that lifts at least respectively one workpiece carrier out of the path and puts it back into the path after the process in the tool.

A redundant information transmission or collection of information regarding the individual data of the workpiece carrier in the controller is proposed in order to be able to preclude movements damaging the transport system or the installation as reliably as possible.

It must be pointed out that within the framework of the present patent application, whenever a "closed-loop control" is referred to, an "open-loop control" is also considered in a downgraded embodiment and is therefore also disclosed, whereas whenever an "open-loop control" is referred, a "closed-loop control" should be understood and disclosed as an improved embodiment.

The controller is preferably set up to assign continuously adjustable stopping points to the workpiece carriers. The controller can thus flexibly respond to production conditions to be modified, without requiring a mechanical intervention in the transport system. When the controller is set up to monitor the position of all the workpiece carriers and to maintain a cleared safety corridor around each workpiece carrier, wherein the size of the safety corridor is dependent upon a speed of movement, collisions can be prevented with a very high probability.

The size of the safety corridor preferably depends on the speed of the workpiece carriers. Thus, when workpiece carriers are parked, it certainly makes sense to reduce the necessary safety distance to a minimum, especially when the termination of the parked state of a row of parked workpiece carriers can take place by individually accelerating the workpiece carriers in sequence and moving them way from the row of parked workpiece carriers. On the other hand, it is readily conceivable that the workpiece carriers move at a speed of several m/s in the paths, especially when rails are provided. A speed of up to 10 m/s or more is readily conceivable. Since the workpiece carriers will normally be metal or carbon-comprising elements, it can be assumed that they will have a certain mass and thus inertia. Therefore, at higher speeds, a considerably greater safety corridor should be kept clear around each workpiece carrier than for example in the parked state.

The controller preferably detects when a workpiece carrier is taken out of a path and/or inserted into a path, whereupon the controller is preferably set up to deactivate, respectively activate a drive for this workpiece carrier.

The workpiece carriers themselves are preferably removable from and insertable into the path without destruction. In a simple but nevertheless very advantageous embodiment a rail system is designed, in which the workpiece carriers have an upward degree of freedom, i.e. against the force of gravity, so that gravity maintains the workpiece carriers in the rail but the workpiece carriers can be simply taken out of the rail upward against the force of gravity or inserted back downward into the rail.

The workpiece carriers preferably have a magnetic drive interacting with the rail system, more specifically a linear motor. Such a motionless drive within the rail systems allows for a very finely graduated closed-loop control of the individual workpiece carriers. Possibilities include more specifically a closed-loop control system as known for example from already known magnetic conveyors or even from large-scale maglev trains used in passenger transportation.

When a device for arranging a carrier adapter on a holding area is provided, a workpiece carrier can be automatically converted. The device for arranging the carrier adapter is preferably locally permanently installed, but can be approached by the workpiece carriers; preferably disposed in a bypass or even in the work conveyor path. In such a design, the workpiece carriers can approach the device for arranging a carrier adapter. The device equips the holding area of each or of only a multitude of workpiece carriers with a carrier adapter for another workpiece and the workpiece carrier can travel onward. Thus, such a design also allows very quickly changing the products to be manufactured, in an ideal design even during production operations, without having to stop production.

The device for arranging a carrier adapter is preferably provided with a store of various carrier adapters.

According to a second aspect of the present invention, the problem is solved by a transport system for a multitude of identical workpieces, more specifically of identical plastic parts, wherein the transport system is constructed as an installation part of a plastics-processing joining system for attaching the workpieces to semi-finished products as a step for manufacturing products, wherein the transport system has a multitude of workpiece carriers on a circulating work conveyor path, wherein the workpiece carriers of the multitude have uniformly configured holding areas, so that respectively one holding area on one workpiece carrier of the multitude can interact with one of the identical workpieces, wherein the transport system is set up to simultaneously transport, during operation, several of the identical workpieces along the work conveyor path by means of the multitude of workpiece carriers, wherein the transport system is characterized in that the workpiece carriers of the multitude have independent drives.

With regard to this aspect also, the workpiece carriers are preferably configured as individual path-bound slides, exactly as preferably provided in the first presented aspect of the invention.

The advantages of the independent movability of the workpiece carriers have already been explained above.

The optional embodiments described with regard to the first aspect of the present invention must be understood as being also applicable to the second aspect of the invention.

The transport system is preferably designed according to both aspects of the invention presented above, wherein it can be additionally equipped with the optionally mentioned features.

A plastics-processing joining system, arranged to attach workpieces, more specifically identical plastic parts, to semi-finished products as a step for manufacturing products is directly advantageous when the joining system has a transport system as described above.

The advantage of the proposed transport system is immediately apparent upon looking at the plastics-processing joining system as a whole: This way, the assignment of the individual workpiece carriers, respectively of the holding areas of the individual workpiece carriers, to the workpieces to be processed in the joining system is more easily detected, for example of the components for producing accesses for medical bags in the form of plastic tubules or other plastic bodies, particularly plastic hollow bodies.

Thus, it is conceivable, for example, that two multitudes of workpiece carriers with different holding areas are provided in the paths of the transport system, in a simple production case only with identical components, that are to be welded into the bags, the workpiece carriers of the first multitude being in the first work conveyor path whereas the workpiece carriers of the second multitude are on the workpiece carrier parking path. It has already been explained that other constellations with regard to the number of workpiece carriers can be expedient, for example two or more multitudes of workpiece carriers in the work conveyor path, in accordance with the number of different workpieces to be processed, at any rate however with regard to the workpieces to be held by different workpiece holding adapters. However, it is also advantageous in such a constellation if otherwise equipped workpiece carriers are additionally provided in the workpiece carrier parking path.

Even when only one multitude of workpiece carriers or at any rate when only one constellation of workpiece carriers is used in production, it is expedient to use a workpiece carrier parking path. That way, the workpiece carriers can be regularly driven into the workpiece carrier parking path in order to cool down. Alternately or additionally, it is conceivable to provide a quality control, which, in case of a supposed or ascertained defect on a workpiece carrier causes the controller to drive the potentially damaged workpiece carrier out of the work conveyor path and instead drive a parked workpiece carrier held in storage onto the work conveyor path.

In order to be able to individually park each multitude of workpiece carriers and to be able to drive each multitude back into the work conveyor path without having to shunt the other multitudes, it is proposed to provide one workpiece carrier parking path for each multitude or for one less than each multitude of workpiece carriers.

When provided with a lesser number of workpiece carrier parking paths, it is still possible to park all the workpiece carriers, if the design is appropriately chosen, for example with a sufficiently long workpiece carrier parking path, which is also within the scope of the present invention. However, if production time is to be optimized, it is proposed to dispense as much as possible with shunting, which can be achieved by way of a plurality of workpiece carrier parking paths.

According to a fourth aspect of the present invention, the problem is solved by a method for operating a plastics-processing joining system, more specifically for producing medical bags and preferably for filling the bags, wherein a transport system for a multitude of identical workpieces, more specifically for a multitude of identical plastic parts, is closed-loop controlled by means of a controller, wherein the workpieces are attached to semi-finished products as a step for manufacturing products, wherein the controller controls the motion speed and/or stopping points of a multitude of workpiece carriers on a circulating work conveyor path in the transport system, wherein the workpiece carriers of the multitude have uniformly designed holding areas, so that respectively one holding area on one of the workpiece carriers of the multitude interacts with one of the identical workpieces, wherein, by means of the transport system, several of the identical workpieces are simultaneously transported along the work conveyor path by means of the multitude of workpiece carriers, wherein the method is characterized in that the workpiece carriers for the multitude of identical workpieces are independently controlled by means of the controller.

According to a fifth aspect of the present invention, the problem is solved by a method for operating a plastics-processing joining system, more specifically for producing medical bags and preferably for filling the bags, wherein a transport system for a multitude of identical workpieces, more specifically for a multitude of identical plastic parts, is closed-loop controlled by means of a controller, wherein the workpieces are attached to semi-finished products as a step for manufacturing products, wherein the controller controls the motion speed and/or stopping points of a multitude of workpiece carriers on a circulating work conveyor path in the transport system, wherein the workpiece carriers of the multitude have uniformly designed holding areas, so that respectively one holding area on one of the workpiece carriers of the multitude interacts with one of the identical workpieces, wherein, by means of the transport system, several of the identical workpieces are simultaneously transported along the work conveyor path by means of the multitude of workpiece carriers, wherein the method is characterized in that the controller optionally drives the multitude of workpiece carriers out of the work path into a workpiece carrier parking path by means of a work path output means, preferably for exchanging the multitude of workpiece carriers against a second multitude of workpiece carriers.

It must be pointed out that the various aspects regarding the advantageous method are combinable and preferably combined.

It is proposed that before, during or after the multitude of workpiece carriers has pulled into the workpiece carrier parking path, the controller drives the second multitude of workpiece carriers out of their workpiece carrier parking path into the work conveyor path, wherein the workpiece carrier parking path is the same workpiece carrier parking path for both multitudes of workpiece carriers, different workpiece carrier parking paths being however preferably provided.

Particularly when medical bags are to be produced, it is proposed that plastic tubules or other plastic bodies are welded between film layers in the joining system, in order to establish an access or several access to the interior of the medical bag, wherein a filling and/or fitting of stoppers is preferably additionally implemented in the joining system.

Finally, it is pointed out that the advantages of the described plastics-processing joining system and of the described method directly extend to the products produced therewith, in particular medical bags.

BRIEF DESCRIPTION OF THE DRAWINGS

In the following, the invention is described in more detail based on an exemplary embodiment with reference to the drawing.

The FIGURE schematically shows a top view onto a transport system for a plastics-processing joining system for manufacturing medical bags with optionally one or two accesses.

DETAILED DESCRIPTION OF THE PREFERRED EMBODIMENTS

The joining system (not represented it its entirety) in the FIGURE consists essentially of various stations, amongst others a welding press for welding at least two film layers to form a bag, wherein tubular components are welded between the two film layers, in order to form an access to the interior of the bag.

In order to be able to precisely position the plastic tubules for the welding process, a first multitude of workpiece carriers 2 with respectively one stick-shaped mandrel 3 (exemplarily labeled) is disposed on a transport system 1. The workpiece carriers (exemplarily labeled) of the first multitude 2 are located on a circulating rail 5. The stick-shaped mandrels 3 of the workpiece carriers 4 of the first multitude 2 are oriented in such a manner that they can bring plastic tubules plugged on them into a welding area 6 of the joining system, in order to come to lie between the film layers (not shown) of the bag 7 (exemplarily labeled) to be produced and to be welded in there.

During operation of the installation, the transport system 1 is closed-loop controlled by a controller (not shown) in such a manner that each of the workpiece carriers 4 of the first multitude 2 is transported in a work direction 8 along the work conveyor path, which is identical to the circulating path 5. In the process, the plastic tubules are plugged onto the stick-shaped mandrels 3, then transported onward by the workpiece carriers 4 and laid between the film layers and welded in the welding are 6 of a welding station. The workpiece carriers 4 then continue along the circulating rail 5, thus forming an endless circuit for production of the bags to be manufactured.

Each of the workpiece carriers 4 is individually close-loop controllable by the controller by way of a magnetic linear drive, namely both with regard to its position and travel direction, travel speed and with regard to the acceleration and deceleration ramps. Furthermore, the controller calculates a safety corridor around each workpiece carrier 4, into which no other workpiece carrier 4 may enter. Otherwise, the controller intervenes in that place.

By way of the linear drive, the workpiece carriers 4 and thus the tubular workpieces supported on the stick-shaped mandrels 3 can be precisely positioned and, as the case may be, also transported together with the bags, for example, if they should first only be attached and only subsequently completely welded, or if, for any other reason, a further transport, at least over a section, together with the film layers and/or the bags to be manufactured is recommended.

In its rail system, the transport system 2 is additionally provided with a bypass 9, which is connected to the circulating rail 5 of the work conveyor path by way of a branching switch 10 and a merging switch 11. Workpiece carriers 12 (exemplarily labeled) of a second multitude of workpiece carriers 13 are located on the bypass 9.

Just as the workpiece carriers 4 of the first multitude 2, the workpiece carriers 12 of the second multitude 13 are also identically designed, the two multitudes being different. Both multitudes have an identical puck-shaped gliding body 14 (exemplarily labeled). However, in a holding area 15 (exemplarily labeled), the workpiece carriers 12 of the second multitude 13 have two stick-shaped mandrels 16, 17 (exemplarily labeled).

The workpiece carriers 12 of the second multitude 13 can thus always receive two tubular workpieces at the same time and transport them into the welding area 6. To this end, the workpiece carriers 12 of the second multitude 13 are also drivable by the controller in an individually closed-loop controllable manner and can be driven out of their workpiece carrier parking area 18 into the work conveyor path of the circulating rail 5 by way of the merging switch 11.

Similarly, the workpiece carriers 4 of the first multitude 2 located on the circulating rail 5 in the FIGURE can also be driven out of the work conveyor path of the circulating rail 5 and into the workpiece carrier parking area 18 at the branching switch 10.

This way, the joining system for producing bags with only one access can be modified for producing bags with two accesses.

It must be explicitly pointed out that the exemplary embodiment presented here is only one of countless different implementation possibilities. However, the important point here is that the present production characteristics can be modified even during operation simply by reprogramming the various parking, respectively circulating, workpiece carriers.

The invention claimed is:

1. A transport system comprising:
   a multitude of workpiece carriers, wherein the multitude of workpiece carriers are positioned along a working path associated with a rail;
   a plurality of output means connected to the rail at respective locations and to provide a respective output path for each workpiece carrier of the multitude of workpiece carriers out of the working path into a respective non-working path, wherein along each non-working path at least one other workpiece carrier is positioned;
   a plurality of input means connected to the rail at respective locations different from the respective locations at which the plurality of output means are connected and to provide a respective input path for each other workpiece carrier out of the respective non-working path into the working path; and
   a controller to:
   drive a respective other workpiece carrier along the respective non-working path and an associated input path into the working path; and
   drive at least one workpiece carrier of the multitude of workpiece carriers along the working path and along an associated output path into the respective non-working path.

2. The transport system according to claim 1, wherein each of the plurality of output means and each of the plurality of input means comprise a rail switch.

3. The transport system according to claim 1, wherein one of the plurality of output means provides a given workpiece carrier of the multitude of workpiece carriers access to a workpiece carrier parking path.

4. The transport system according to claim 3, wherein the workpiece carrier parking path corresponds to a dead end.

5. The transport system according to claim 3, wherein the workpiece carrier parking path is associated with a corresponding bypass.

6. The transport system according to claim 1, wherein each of the multitude of workpiece carriers comprise a holding area and each workpiece carrier positioned along a corresponding non-working path comprises a holding area, wherein each holding area of the multitude of workpiece carriers is one of different and same from each workpiece carrier positioned along the corresponding non-working path.

7. The transport system according to claim 1, wherein the controller is to individually control a position of each workpiece carrier of the multitude of workpiece carriers and each other workpiece carrier positioned along a corresponding non-working path.

8. The transport system according to claim 7, wherein the controller is to continuously assign adjustable stopping points to each workpiece carrier of the multitude of workpiece carriers.

9. The transport system according to claim 7, wherein the controller is to monitor positions of each workpiece carrier of the multitude of workpiece carriers and to maintain a cleared safety corridor around each workpiece carrier of the multitude of workpiece carriers, wherein the size of the safety corridor is based on a motion speed.

10. The transport system according to claim 7, wherein the controller is to detect when a given workpiece carrier is taken out of a given path and/or inserted into the given path, and to one of deactivate and activate a drive associated with the given workpiece carrier.

11. The transport system according to claim 1, wherein a given workpiece carrier is designed to be one of removable from and insertable into the given path without destruction, wherein the given path comprises one of the working-path and the non-working path.

12. The transport system according to claim 1, wherein each workpiece carrier of the multitude of workpiece carriers is associated with a magnetic drive, the magnetic drive being controllable by the controller to adjust a position of a respective workpiece carrier of the multitude of workpiece carriers.

13. The transport system according to claim 1, wherein a device for arranging a carrier adapter on a holding area is provided.

14. The transport system according to claim 1,
wherein each of the plurality of output means is connected to a respective bypass associated with a corresponding non-working path, and
wherein each of the plurality of input means is connected to the respective bypass associated with the corresponding non-working path.

15. The transport system according to claim 14, further comprising:
a camera one of disposed above and below the working path associated with the rail; and
image analysis means to recognize a type of workpiece carrier of at least one workpiece carrier of the multitude of workpiece carriers positioned along the working path.

16. The transport system according to claim 1,
wherein the working path corresponds to a plurality of working paths, and
wherein each workpiece carrier of the multitude of workpiece carriers is configured to move along a respective working path of the plurality of working paths.

17. The transport system according to claim 1, wherein each of the plurality of input means and the plurality of output means are connected to a respective bypass associated with a corresponding non-working path.

18. The transport system according to claim 17, wherein each bypass comprises a rail.

19. The transport system according to claim 18, wherein the rail is circulating rail.

20. The transport system according to claim 1, wherein the controller sets a given corridor around each workpiece carrier of the multitude of workpiece carriers.

21. The transport system according to claim 20, wherein a size of the given corridor for each workpiece carrier of the multitude of workpiece carriers is based on a given position associated with each workpiece of the multitude of workpiece carriers.

22. The transport system according to claim 20, wherein the size of the given corridor of the at least one workpiece carrier of the multitude of workpiece carriers is greater when the at least one workpiece carrier is positioned along the working path at a given instance of time relative to when the at least one workpiece carrier is positioned along the respective non-working path at another instance of time.

* * * * *